United States Patent [19]
Hamalainen et al.

[11] Patent Number: 6,072,787
[45] Date of Patent: Jun. 6, 2000

[54] HIGH-SPEED DATA TRANSMISSION IN A DIGITAL MOBILE COMMUNICATION SYSTEM

[75] Inventors: Jari Hamalainen, Tampere; Jari Vainikka, Vantaa, both of Finland; Zhi-Chun Honkasalo, Bedford, Tex.; Harri Jokinen, Hiisi; Harri Posti, Oulu, both of Finland; Harri Honkasalo, Bedford; David Lin, Frisco, both of Tex.

[73] Assignee: Nokia Telecommunications Oy, Espoo, Finland

[21] Appl. No.: 08/676,024

[22] Filed: Jul. 5, 1996

Related U.S. Application Data

[63] Continuation-in-part of application No. PCT/FI95/00527, Sep. 26, 1995.

[30] Foreign Application Priority Data

Sep. 27, 1994 [FI] Finland ..................................... 944488

[51] Int. Cl.[7] .............................................. H04J 3/16
[52] U.S. Cl. .......................................... 370/335; 370/468
[58] Field of Search ................................... 370/236, 252, 370/251, 342, 441, 229–235, 311, 312–338, 341, 343–345, 347, 349, 442, 468, 395, 389, 209; 375/200, 205; 455/436, 437, 439, 442, 450, 452, 453, 422, 38.1, 524, 525, 517

[56] References Cited

U.S. PATENT DOCUMENTS

| | | | |
|---|---|---|---|
| 4,700,341 | 10/1987 | Huang | 370/471 |
| 4,949,395 | 8/1990 | Rydbeck | 455/33 |
| 5,023,869 | 6/1991 | Grover et al. | 370/463 |
| 5,070,498 | 12/1991 | Kakuma et al. | 370/243 |
| 5,200,956 | 4/1993 | Pudney et al. | 370/95 |
| 5,555,257 | 9/1996 | Dent | 370/319 |
| 5,613,198 | 3/1997 | Ahmadi et al. | 370/337 |

FOREIGN PATENT DOCUMENTS

| | | | |
|---|---|---|---|
| 2112762 | 7/1994 | Canada | H04J 3/16 |
| 0 332 818 | 9/1989 | European Pat. Off. | H04L 11/20 |
| 0 615 393 | 9/1994 | European Pat. Off. | H04Q 7/04 |

OTHER PUBLICATIONS

"An Overview of the Application of Code Division Multiple Access (CDMA) to Digital Cellular Systems and Personal Cellular Networks", May 21, 1992.

*Primary Examiner*—Dang Ton
*Attorney, Agent, or Firm*—Pillsbury Madison & Sutro

[57] ABSTRACT

For data transmission in a digital mobile communication system, in a mobile communication system employing a so-called multi-channel access technique, one or more traffic channels may be allocated to a mobile station for data transfer, in accordance with the data transfer rate required by the application using the mobile station. Minimum and maximum requirements are determined for the data transfer rate of the user data. The mobile communication network dynamically adjusts the channel configuration assignment to the mobile station for the data call, so as to consist of one or more traffic channels, within the limits of the minimum and maximum requirements of the data transfer rate, depending on the changing allocation state of the resources of the mobile communication network.

6 Claims, 7 Drawing Sheets

HIGH-SPEED DATA TRANSMISSION IN A DIGITAL MOBILE COMMUNICATION SYSTEM

RELATED APPLICATIONS

This is a continuation-in-part (CIP) of International PCT Application PCT/FI95/00527, filed on Sep. 26, 1995.

FIELD OF THE INVENTION

The invention relates to a data transmission in a digital mobile communication system.

There are several multiple access modulation techniques for facilitating communications in which a large number of mobile users are present. These techniques include time division multiple access (TDMA), code division multiple access (CDMA), and frequency division multiple access (FDMA).

In TDMA mobile telecommunication systems, time-division communication takes place on the radio path in successive TDMA frames, each of which consists of several time-slots. In each time-slot, a short information packet is sent as a radio frequency burst which has a finite duration and which consists of a set of modulated bits. The time-slots are mainly used for transmitting control channels and traffic channels. On the traffic channels, speech and data are transmitted. On the control channels, signaling between a base station and mobile subscriber stations is carried out. An example of a TDMA radio system is the Pan-European mobile communication system GSM (Global System for Mobile Communications).

CDMA is a modulation and multiple access scheme based on spread spectrum communication. Unlike FDMA or TDMA, in CDMA, a large number of CDMA signals (users) simultaneously share the same wide band radio channel, typically 1.25 MHz. Pseudorandom noise (PN) binary codes, so called spreading codes, are used to distinguish between different CDMA signals, i.e., traffic channels on the wide band radio channel. A separate spreading code is used over each connection between a base station and a subscriber terminal. In other words, the narrow-band data signal of the user is conventionally multiplied by the dedicated spreading code, and thereby spread in bandwidth to the relatively wide band radio channel. The signals of the users can be distinguished from one another in the receivers on the basis of the unique spreading code of each connection, by using a correlator which accepts only a signal energy from the selected spreading code and despreads its spectrum into a narrow-band signal. The other users' signals, whose spreading codes do not match, are not despread in bandwidth, and as a result, contribute only to the noise and represent a self-interference generated by the system. The spreading codes of the system are preferably selected so that the codes used in each system cell are mutually orthogonal, i.e., they do not correlate with each other. Thus, in the CDMA systems, the spreading code unique to each user's or user' signal provides a traffic channel in a similar sense as a time slot in the TDMA systems. CDMA is described in more detail in the document: "An overview of the application of code division multiple access (CDMA) to digital cellular systems and personal cellular networks", Qualcomm Incorporated, 1992, U.S.A., (Document Number EX60-10010).

In traditional TDMA and CDMA mobile communications systems, the maximum data rate at the radio interface is relatively low.

For communication in conventional mobile communications systems, each mobile station is assigned one traffic channel for data or speech transmission. Thus, the GSM system, for instance, may have us to eight parallel connections to different mobile stations on a same carrier wave. The maximum data transfer rate on one traffic channel is restricted to a relatively low level according to the available bandwidth and the channel coding and error correction used in the transmission. In the GSM system, for instance, the rate is 9.6 kbit/s or 12 kbit/s. In addition, in the GSM system a so-called half-rate (max. 4.8 kbit/s) traffic channel may be chosen for low speeds of speech coding. A half-rate channel is established when a mobile station communicates in a certain time-slot only in every second time-slot, i.e., at half-rate. A second mobile station communicates in every second time-slot of the same frame. The capacity of the system in terms of the number of subscribers may thus be doubled, in other words, up to 16 mobile stations may communicate simultaneously on the same carrier wave.

In the last few years, the need for high-speed data services in mobile communication networks has remarkably increased. Data transfer rates of at least 64 kbit/s would be required for utilizing ISDN (Integrated Services Digital Network) circuit switched digital data services, for example. Data services of the public network PSTN, such as modems and telefax terminals of class G3, require higher transfer rates, such as 14.4 kbit/s. One of the growing areas of mobile data transfer that requires higher transfer rates than 9.6 kbit/s is the mobile video service. Services of this kind include, e.g., security control by cameras, and video databases. The minimum data transfer rate in video transfer can be, for instance, 16 or 32 kbit/s.

The data transfer rates of the present mobile communication networks are not, however, adequate to satisfy new needs of this kind.

One way to solve the problem is to use several traffic channels, e.g., TDMA time-slots, for one mobile station. In this way, one mobile station may transmit and receive data at higher data transfer rates by multiplexing it to several traffic channels. This is termed a multi-channel access technique.

When several traffic channels are used for one mobile station, problems arise if a sufficient number of channels is not available. This may occur in the call set-up phase and in connection with handover. Handover refers to transferring the mobile station from one channel onto another channel of the same cell or an adjacent cell during a call. A problem arises if the mobile station is operating at a high data transfer rate, and the new cell can not provide, after the handover, a data transfer rate as high as that of the previous cell. One solution would be to interrupt the connection if the quality, i.e., the data transfer rate of the data transfer service is not adequate in connection with call set-up or handover, or after the handover. However, this solution is not acceptable.

SUMMARY OF THE INVENTION

An object of the present invention is to relieve the problems caused by capacity restrictions in a mobile communication network which employs the multi-channel access technique in data transmission.

This is achieved with a method for data transmission in a digital mobile communication system, in which one or more traffic channels may be allocated to a mobile station for data transmission in accordance with the requirements set by the application using the mobile station. The method includes determining a data call a desired level of service for the user data transfer, and dynamically adjusting the channel configuration. The channel configuration includes one or more traffic channels and is assigned to the mobile station for a data call within the limits of the desired level of service, depending on the varying allocation state of the resources of the mobile communication network.

In the invention, the data transfer rate of a data call is dynamically adjusted depending on the resources of the network in a mobile communication system employing a so-called multi-channel access technique in which system maximum, and optionally maybe also minimum, requirements are determined for the transfer rate of the user data, in addition to the presently specified parameters used for establishing a data call. These requirements may include the following parameters: the required grade of service (data transfer rate) and the desired grade of service (data transfer rate). The desired grade of service determines the data transfer rate the mobile station wishes to be able to use. Simultaneously, the desired data transfer rate is also the maximum data transfer rate to be allowed for the mobile station. The required grade of service, if any, determines the minimum data transfer rate that must be provided for ensuring the continuity of data transfer. If the required data transfer rate cannot be provided, the call set-up is interrupted or the data call is interrupted. These parameters allow the mobile communication network to reduce the data transfer rate if the cell is not capable of providing the desired data transfer rate in connection with call set-up or handover. Thus, the number of calls interrupted or prevented due to the lack of resources decreases.

Instead of transferring the parameters, the mobile station may indicate the maximum and optional minimum, requirements to the mobile communication network in a number of alternative ways, such as indicating the grade of service. The the maximum, and possible minimum, requirements used are then selected in accordance with the indicated grade of service in the mobile communication network.

In accordance with the present invention, the mobile communication network increases the channel configuration of the data call, and thus, also the data transfer rate to a desired level once the resources required are released. In a preferred embodiment of the invention, the mobile communication network may, during a call, after a call set-up, or after a handover, reduce the channel configuration assigned to a data call down to the minimum required data transfer rate, to release resources in the mobile communication network to serve other traffic, such as new data calls.

The invention also relates to a mobile communication system for implementing this method.

BRIEF DESCRIPTION OF THE DRAWINGS

In the following, the invention will be described in more detail by way of example with the aid of the preferred embodiments of the invention and with reference to the attached drawings, in which.

DETAILED DESCRIPTION OF PREFERRED EMBODIMENTS OF THE INVENTION

The present invention can be applied to a high-speed data transmission in digital mobile communication systems utilizing various multiple access methods, such as TDMA or CDMA. In different multiple access methods, the physical concept of traffic channel varies, being primarily defined by a time slot in TDMA systems, a spreading code in CDMA systems, a radio channel in FDMA systems, a combination thereof, etc. The basic concept of the present invention is, however, independent of the type of the traffic channel and the multiple access method used.

Examples of mobile communications systems include the Pan-European digital mobile communication system GSM, DCS1800 (Digital Communication System), UMTS (Universal Mobile Telecommuni-cation System), FPLMTS (Future Public Land Mobile Telecommunication System), etc.

Figure 1:
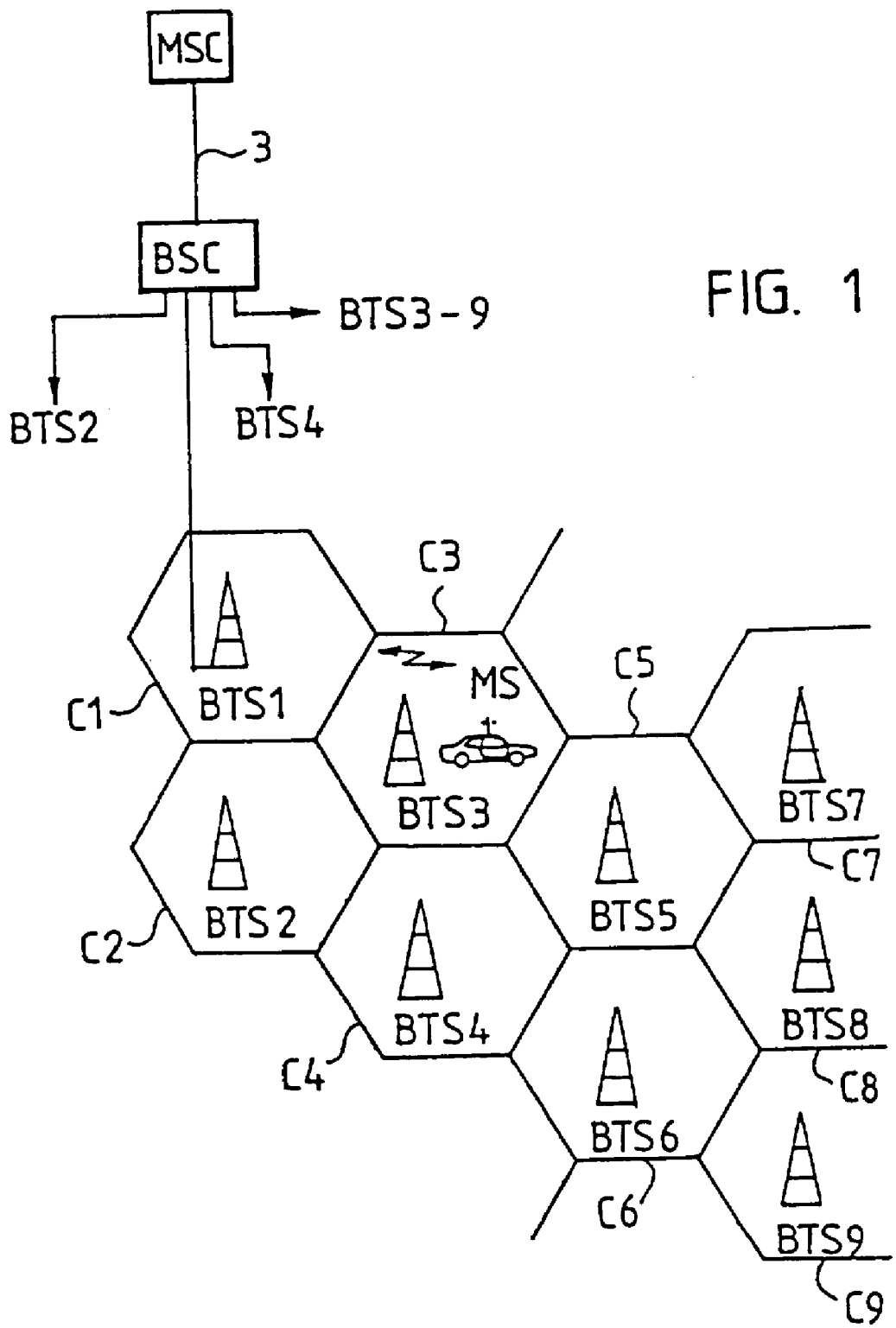
FIG. 1 illustrates a part of the mobile communication system in which the method of the invention may be applied.

FIG. 1 illustrates a mobile communication system of the same type as GSM as an example. GSM (Global System for Mobile Communications) is a pan-European mobile communication system. FIG. 1 shows the basic structure of the GSM system, not paying close attention to its characteristics or other aspects of the system. The GSM system is described in greater detail in GSM recommendations and in "The GSM System for Mobile Communications", M. Mouly & M. Pautet, Palaiseau, France, 1992, ISBN:2-9507190-0-7.

A mobile services switching center (MSC) is in charge of switching incoming and outgoing calls. It performs similar operations as the exchange of a public switched telephone network (PSTN). In addition, it also performs operations typical of mobile telecommunications only, such as subscriber location management, jointly with the subscriber registers of the network. The GSM system contains at least subscriber registers, such as home location register (HLR) and visitor location register (VLR), which are not shown in FIG. 1. Specific information on the location of the subscriber, such as the accuracy of the location area, are stored in a visitor location register VLR, the number of which is typically one per each mobile services switching centre (MSC). An HLR, in turn, knows the VLR within the area of which a mobile station MS is located. Mobile stations MS are switched to the center (MSC) by base station systems. A base station system comprises a base station controller BSC and base stations BTS. One base station controller BSC is used for controlling several base stations BTS. The tasks of the BSC include, e.g., handovers in such cases in which handover is performed within a base station or between two base stations both controlled by the same BSC. FIG. 1 shows for clarity one base station system only, in which a base station controller BSC is connected with nine base stations BTS1-BTS9, having coverages which, in turn, provide corresponding radio cells C1-C 9.

The GSM system uses a time division multiple access (TDMA) method in which time-division traffic takes place on the radio path in successive TDMA frames each of which consists of several time-slots. In each time-slot, a short information packet is sent as a radio frequency burst which has a finite duration and which consists of a set of modulated bits. The time-slots are mainly used for transmitting control channels and traffic channels. On the traffic channels, speech and data are transmitted. On the control channels, signaling between a base station and mobile subscriber stations is carried out.

Figure 2:
FIGS. 2, 3, 4 and 5 illustrate the TDMA frame structure.
Figure 3:
Figure 4:
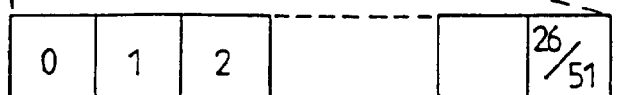
Figure 5:
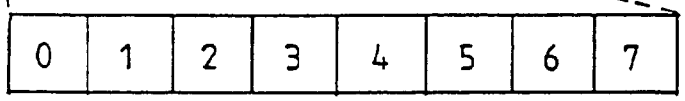

Channel structures used in the radio interface of the GSM system are defined in closer detail in the ETSI/GSM recommendation 05.02. The TDMA frame structure of the GSM system is illustrated as an example in FIGS. 2–5. FIG. 5 shows one TDMA basic frame which includes eight time-slots 0–7 used as traffic channels or control channels. Only one radio frequency burst shorter than the duration of the time-slot is transmitted in each time-slot. Once one TDMA basic frame ends in time-slot 7, the time-slot 0 of the following basic time-slot immediately begins. Thus, 26 or 51 successive TDMA frames form one multiframe, depending on whether a traffic channel or a control channel structure is in question, as illustrated in FIG. 4. A superframe, in turn, consists of 51 or 26 successive multiframes depending on whether the multiframes have 26 or 51 frames, as illustrated in FIG. 3. A hyperframe consists of 2048 superframes, as illustrated in FIG. 2.

In normal operation, a mobile station MS is assigned, at the beginning of a call, one time-slot as a traffic channel from some carrier wave (single-slot 30 access). The mobile station is synchronized with this time-slot for transmitting and receiving radio frequency bursts.

In data transfer in accordance with the invention, when a mobile station MS requires a data transfer rate higher than can be provided by one traffic channel for transmission of user data, the MS is assigned a channel or a time-slot configuration that comprises two or more time-slots from one or more frames on a same or a different frequency by a multi-slot access technique. It is not essential to the present invention which multi-slot access technique is used. An example of a multi-slot access technique for which the present invention is well suited is disclosed in Finnish patent applications 942190 and 942191 of the applicant (filed on May 11, 1994, and secret on the application date of the present application). In these applications, a high-speed signal is multiplexed to several channels (time-slots) of a lower speed, thus transferred over the radio path and demultiplexed in a receiver back to one signal. These applications are incorporated herein by reference.

As it has been stated previously, however, problems arise in connection with the multi-slot access technique if there are not a sufficient number of channels available. This may occur in the call set-up phase and in connection with handover.

In accordance with the present invention, the mobile station indicates at the beginning of call set-up the minimum and the maximum requirements for the data transfer rate of user data to the mobile communication network. These requirements are two new parameters, in addition to the presently specified parameters used for establishing a data call. Indicating the requirements to the mobile communication network refers herein to all the manners in which the mobile station can indicate the minimum and the maximum requirements, without limiting, e.g., to direct transmission of the requirements as such. For example, the mobile station may indicate an appropriate grade of service, in which case it is provided at least the performance of the data channel in accordance with the minimum requirement on this grade of service, and the performance of the data channel in accordance with the maximum requirement on this grade of service, at the most.

In the following examples, these minimum and maximum requirements are defined with parameters "required grade of service" and "desired grade of service", but the requirements may be defined in other ways, as well. The desired grade of service determines the data transfer rate, i.e., the channel configuration formed by one or more channels or time-slots that the mobile station wishes to be able to use. Simultaneously, this desired data transfer rate is also the maximum data transfer rate to be allowed to the mobile station. The required grade of service determines the minimum data transfer rate that must be provided for ensuring the continuity of data transfer. With the aid of these parameters, the mobile communication network may, depending on the resources of the network, assign a data call a data transfer rate which is within the limits of the desired data transfer rate and the required data transfer rate. Provided that not even the minimum data transfer rate can be provided, the data call or the call set-up is interrupted. It is also possible in some situations that the mobile station does not set any specific standards for the minimum grade of service of the data transfer rate, or it leaves the minimum performance to be freely chosen by the mobile communication network.

In accordance with the invention, the data transfer rate assigned to the mobile station for a data call is dynamically adjusted within the limits of the required data transfer rate and the desired data transfer rate depending on the resources of the mobile communication network. The mobile communication network may, in connection with call set-up or handover, assign the data call a smaller time-slot configuration, i.e. fewer time-slots than the maximum requirement for the data transfer rate if the resources are not sufficient at that particular moment for providing a desired channel configuration, and thus, a desired data transfer rate. The required resources may, however, be released later, in which case it would be sensible from the point of view of both the mobile station user and the mobile communication network to move over to a higher data transfer rate.

For this reason, the mobile communication network of the invention increases the channel configuration, and thus the data transfer rate of the data call to a desired level when the resources required therefor are released in the same cell. In a preferred embodiment of the invention, the mobile communication network may, during a call, even after a call set-up or a handover, reduce the channel configuration assigned to a data call, down to the channel configuration corresponding to the minimum requirements for the transfer rate of user data, to release resources in the mobile communication network for to serve other traffic.

Figure 7:
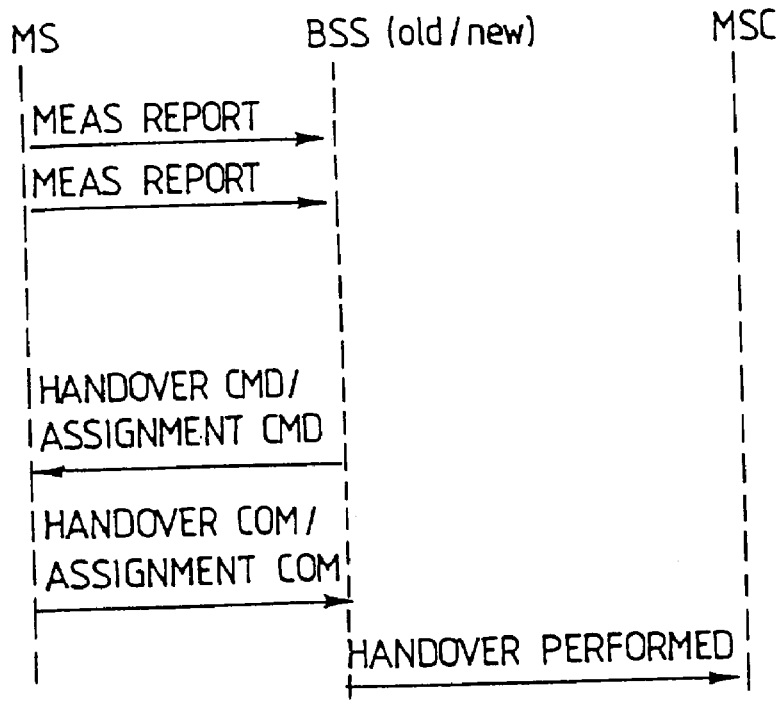
Figure 8:
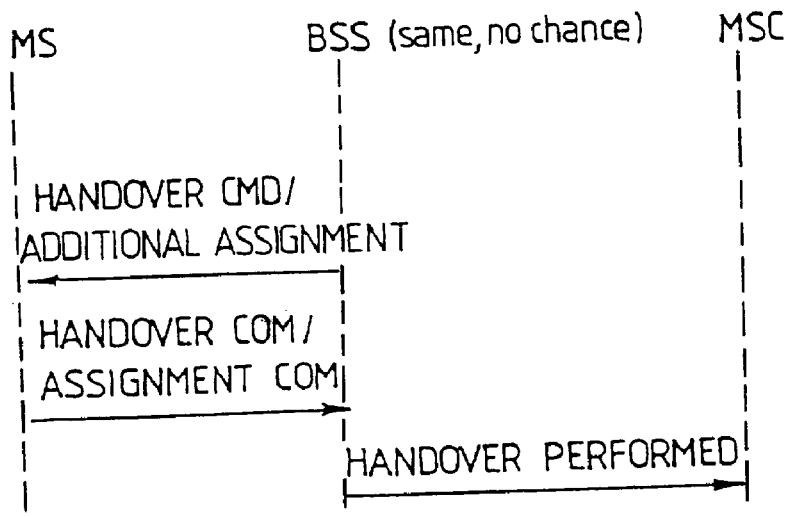

In the following, the invention will be described in more detail by way of example, in connection with handover within a base station system BSS (FIG. 7) and adjustment of the data transfer rate carried out during a call (FIG. 8). Other typical handover situations, which are not discussed in more detail herein, are handovers between base station systems BSS and handover between mobile services switching centers.

Figure 6:
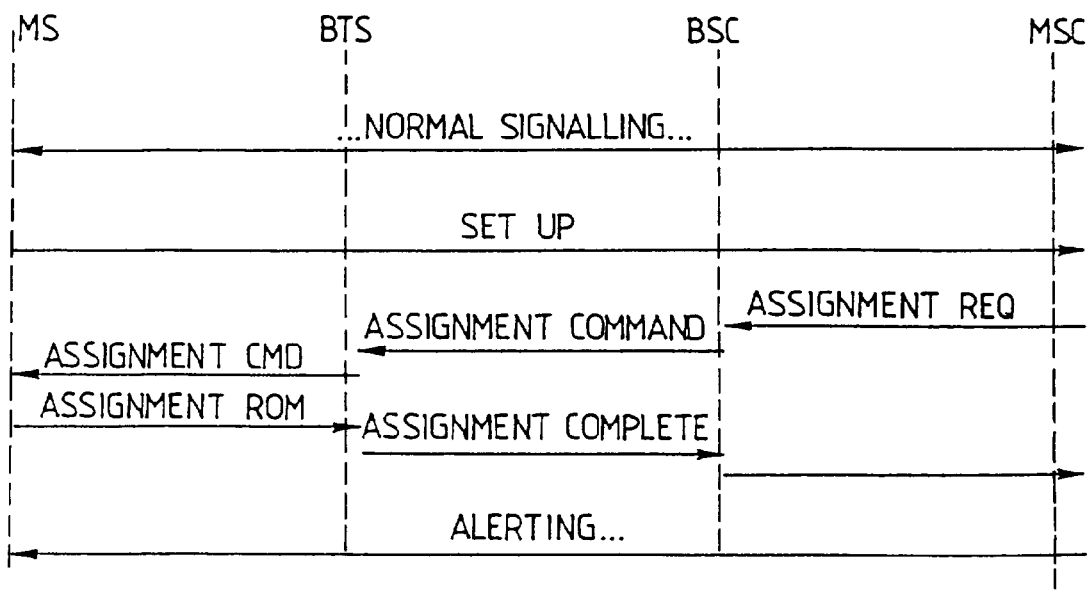
FIGS. 6, 7 and 8 are signalling diagrams, which are correspondingly connected with call set-up, handover, and the adjustment of the data transfer rate carried out during a call in accordance with the invention.

FIG. 6 shows, in connection with call set-up, only the signaling that is essential to disclosing the invention. It must be noted, however, that in addition to the described signaling messages, other messages are also transmitted in connection with the call set-up, which are not shown herein for clarity, however. As to the GSM system, for instance, this signaling is precisely defined in the GSM specifications concerning call set-up.

In FIG. 6, normal call set-up signaling takes place first, whereafter the MS sends a call set-up message SETUP, which is transmitted to a mobile services switching center MSC. In accordance with the invention, the SETUP message contains, in addition to the parameters normally required for setting up a data connection, two new parameters, the maximum desired data transfer rate DRMAX and the minimum required data transfer rate DRMIN. In the SETUP message of the GSM system, these parameters may be included in a Bearer Capability Information Element BCIE. The BCIE is disclosed in the GSM recommendation 04.08, version 4.7.0, pages 435–443. The MSC sends a serving base station controller BSC an assignment request message (Assignment REQ), which is modified to contain parameters DRMAX and DRMIN. The BSC checks whether it has a sufficient capacity for serving the data call, and assigns the data call, depending on the current capacity, some time-slot configuration corresponding to the data transfer rate, which is within the limits of parameters DRMAX and DRMIN. Thereafter, the BSC sends the base station BTS serving the mobile station MS an assignment command message (Assignment Command), which contains the information on the time-slots assigned to the data call and on the assigned data transfer rate. The base station BTS sends the mobile station an assignment command message (Assignment Command), which contains the information on the time-slots assigned to the data call and on the assigned data transfer rate. The mobile station MS starts to prepare for data transfer in the assigned time-slots by using the given data transfer rate, and sends the base station BTS an assignment acknowledgement (Assignment Complete). The base station BTS sends the base station controller BSC an acknowledgement (Assignment Complete) The BSC, in turn, sends the mobile services switching centre MSC an assignment acknowledgement (Assignment Complete), which contains the information on the data transfer rate assigned to the data call by the BSC. After this, normal call set-up signaling takes place for starting the transfer.

If the base station controller BSC is not capable of assigning the data call, the time-slot configuration corresponding to the minimum required data transfer rate DRMIN for lack of resources, it will send a report to the MSC, in form of an Assignment Failure message. Then the MSC interrupts the call set-up. The resources that determine the data transfer rate to be assigned to the data call comprise at least the channels, i.e., the time-slots that are available at the base station BTS serving the mobile station at that particular moment.

FIG. 7 shows only the signaling that is essential to the invention. However, it must be noted that, in addition to the signaling messages described above, other messages are also sent in a handover situation, although these messages are not described herein for clarity. As to the GSM system, for instance, this signaling is precisely defined in the GSM specifications concerning call set-up.

In handover within one base station system BSS illustrated in FIG. 7, the MS regularly reports the measurement results of the signals of the adjacent cells to the base station controller BSC of the serving base station system BSS (Meas Report). The base station controller BSC makes the handover decisions on the based the criteria of the radio path by utilizing these measurements, or for other reasons, such as for distributing the capacity. After making the handover decision, the BSC assigns the data call, depending on at least the time-slot resources of the target cell of the handover, a channel configuration that provides a data transfer rate, which is at least the minimum required data transfer rate DNMIN and not higher than the maximum desired data transfer rate DRMAX. The data transfer rate (time-slot configuration) provided by the new cell is not necessarily the same as that provided by the previous cell. In other words, the data transfer rate may increase or reduce in the new cell in accordance with the available resources and within thee limits of parameters DRMAX and DRMIN. Either the base station controller BSC or the base station BTS stores parameters DRMAX and DRMIN for every MS that is located within their area and has an ongoing high-speed data call. Provided that the minimum required data transfer rate cannot be provided, the call or the handover attempt will be interrupted, and an adjacent cell, second best in terms of other criteria and able to provide an adequate data transfer rate, will be selected as the new target cell for handover. The BSC sends the MS a handover command message (Handover Command), which contains the information on the allocated data transfer rate, and the description of the allocated time-slots. Now the MS is able to start communication with the channel configuration allocated in the new cell, and it sends an acknowledgement (Handover Completed) to the base station system BSS. The BSS, in turn, sends the message Handover Performed to the mobile services switching center MSC.

FIG. 8 illustrates the adjustment of the data transfer rate during a call in accordance with the invention. The base station system BSS detects that there are free time-slot resources in the base station system for a data call the current channel configuration (the number of time-slots) and the corresponding data transfer rate of which are lower than the channel configuration in accordance with the maximum requirement determined in terms of the user data transfer rate, and the corresponding maximum desired data transfer rate DRMAX. In that case, the BSS commands the MS to use a higher data transfer rate and a larger number of time-slots by carrying out a handover within the base station or a new channel assignment. In other words, the BSS allocates the data call a new channel configuration in the same cell and sends the MS a handover command message (Handover Command) or an additional assignment message (Additional Assignment) of the channel, that message containing the information on the allocated data transfer rate and the description of the allocated time-slots. Now, the MS is able to start communication with the new, allocated channel configuration in the same cell, and it sends an acknowledgement Handover Complete (or Assignment Complete) to the base station system BSS. The BSS, in turn, sends the message Handover Performed to the mobile services switching center MSC.

Correspondingly, in accordance with FIG. 8, it is possible to reduce the channel configuration (number of time-slots) of one or more data calls, and thus the data transfer rate, but, only to the level in accordance with the minimum requirements for the user data transfer rate of each data call, when the base station system BSS detects that it needs free time-slots for other traffic in the cell. The BSS then allocates the data call a new channel configuration and reports it to the MS in accordance with FIG. 8. The channel configurations assigned to data calls may be adjusted, e.g., so that the mobile communication network is able to serve as many requested connections as possible, simultaneously when it is endeavored to keep the channel configuration assigned to each data call as high as possible within the limits of said minimum and maximum requirements.

As noted above, the present invention is universally applicable on various kinds of multiple access methods and traffic channels. In CDMA systems, the traffic channels are defined by pseudorandom noise (PN) codes, i.e., spreading codes, assigned to each user or connection. From the present invention point of view, the CDMA traffic channel is similar to the TDMA traffic channel. The basic contribution of the present invention is allocate parallel traffic channels to a single user so as to provide a high-speed data connection.

Figure 9:
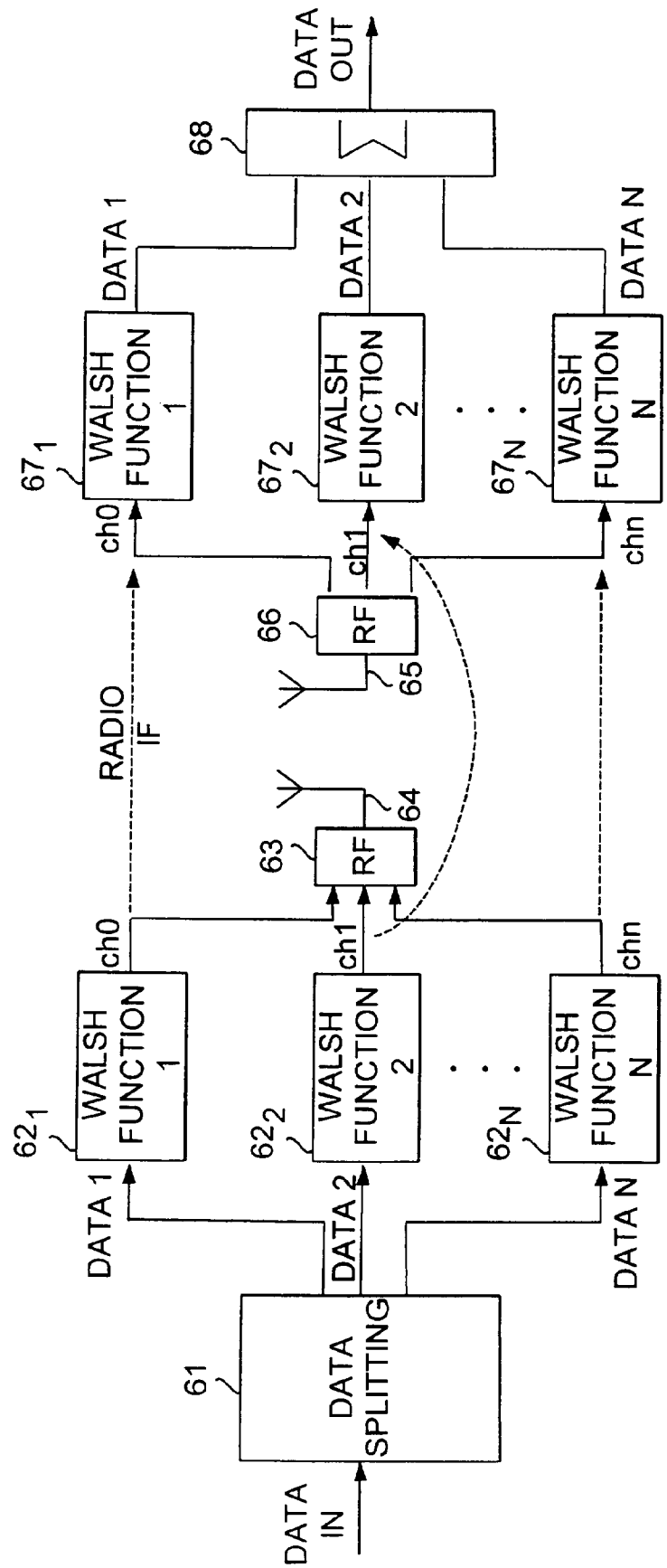
FIGS. 9, 10A and 10B illustrate a high-speed. data transmission according to the present invention over N parallel CDMA traffic channel.

Such a high-speed data transmission according to the present invention over N parallel CDMA traffic channels is illustrated in FIG. 9. A high-speed data signal DATAIN that is to be transmitted over the radio path is divided in a data splitter 61 into the required number of slower-speed data signals DATA1 . . . DATAN. A respective number N of parallel CDMA traffic channels ch0 . . . chn is allocated for the transmission. In other words, an unique spreading code is allocated for each slower-speed signal DATA1 . . . DATAN in order to distiquish them from each other during simultaneous transmission over the radio interface. The spreading codes of the system are preferably selected in such a way that the codes used in each system cell are mutually orthogonal, i.e., they do not correlate with each other. One class of suitable orthogonal binary sequences is called the Walsh function. In the embodiment shown in FIG. 9, the traffic channel separation is done by coding (multiplying) each lower-speed data stream DATA1 . . . DATAN by modified Walsh functions 1 . . . N of length 255 in respective Walsh encoders $62_1$ . . . $62_N$, in order to spread the data streams in bandwidth. The Walsh function is modified so that last bit of all of the functions have been deleted. The spread-spectrum data streams are fed to through radio frequency (RF) parts 63 to an antenna 64 for transmission over the radio interface.

The RF signal received at receiving antenna 65 is fed through radio frequency (RF) parts 66 and split in parallel to correlator branches $67_1$ . . . $67_N$. Correlators $67_1$ . . . $67_N$ are Walsh decoders each of which decodes (multiplies) the received spread-spectrum signal by the Walsh function 1 . . . N of the respective CDMA traffic channel ch0 . . . chn, in order to despread the signal in bandwidth and to restore the original bandwidth of the respective slow-speed data stream DATA1 . . . DATAN. The restored slow-speed data streams DATA1 . . . DATAN are combined in a combiner 68 into a high-speed data stream DATAOUT.

A data transmission according to the present invention through the parallel CDMA traffic channels can thus be accomplished to similar principles as described above for TDMA traffic channels. The only difference is that spreading codes (e.g., Walsh functions) are used instead of time slots as traffic channels.

Typically, there are various coding and signal processing operations, such as channel coding (convolutional coding), symbol repetition, interleaving, etc., involved with the data transmission. These additional operations are not essential in the point of view of present invention. In the embodiment of FIG. 9, it is assumed that these coding and interleaving operations, if any, are done to the high-speed data streams DATAIN and DATAOUT prior to the data splitting 61 and subsequent to data combining 68.

Figure 10A:
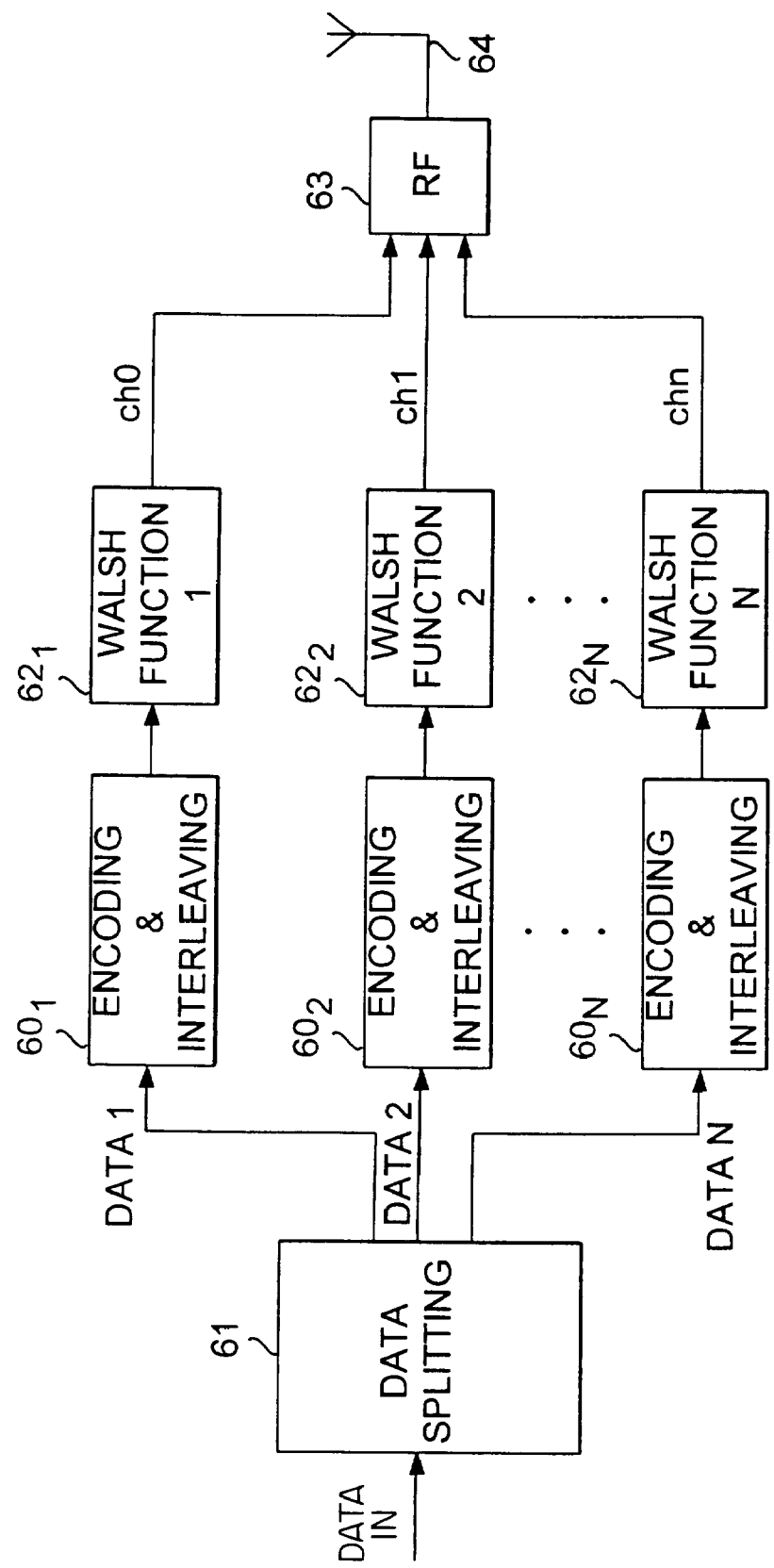
Figure 10B:
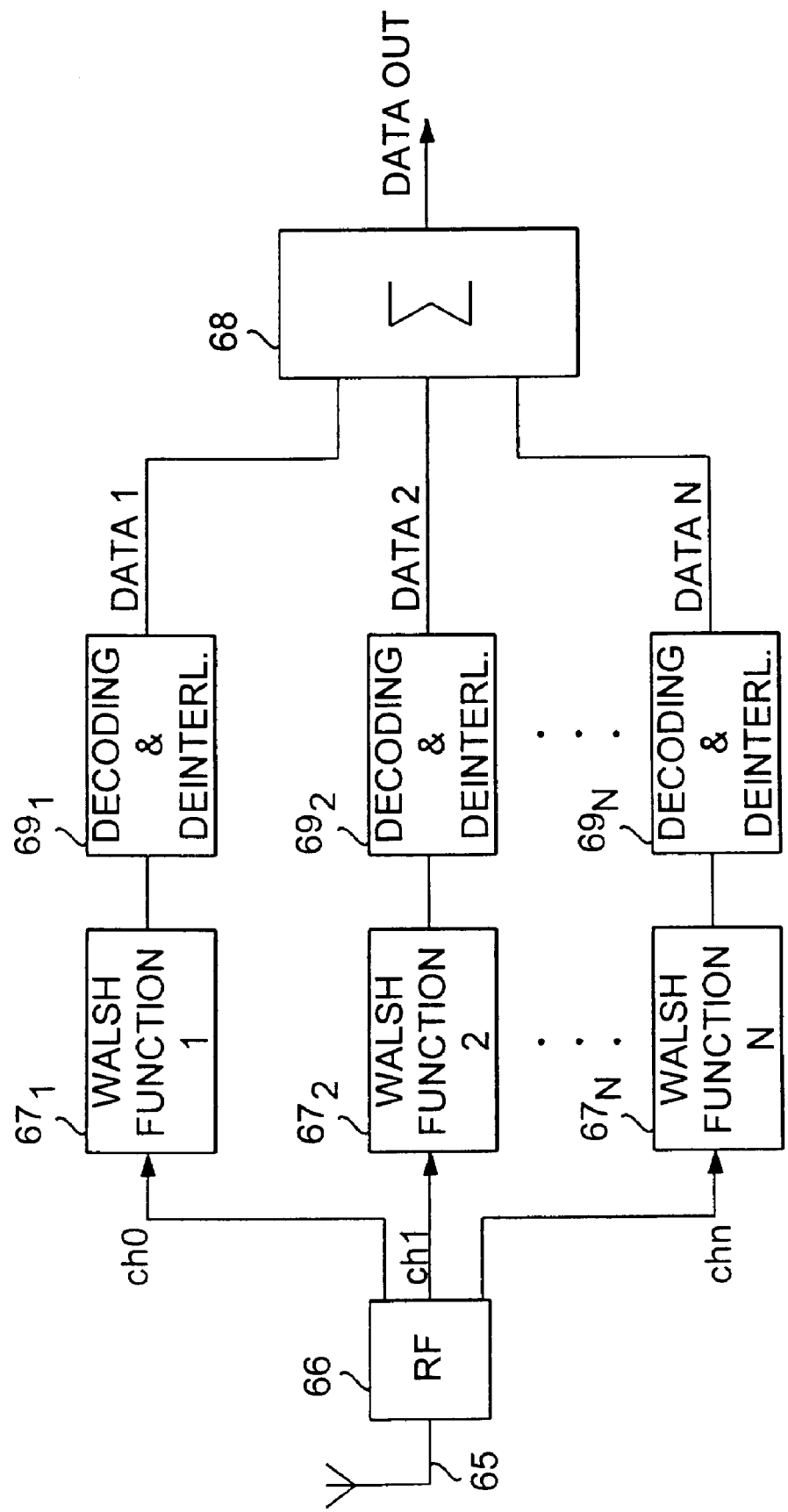

In another embodiment illustrated in FIGS. 10A and 10B, the channel coding, interleaving and other additional operations are done separately on each slow-speed data stream DATA1 . . . DATAN. To this end, encoding and interleaving blocks $60_1$ . . . $60_N$ are provided between the data splitter 61 and the Walsh encoders $62_1$ . . . $62_N$ in the transmitter of FIG. 10A. Similarly, decoding and deinterleaving blocks $69_1$ . . . $69_N$ are provided between the Walsh decoders $67_1$ . . . $67_N$ and the data combiner 68 in the receiver of FIG. 10B.

Figure 11:
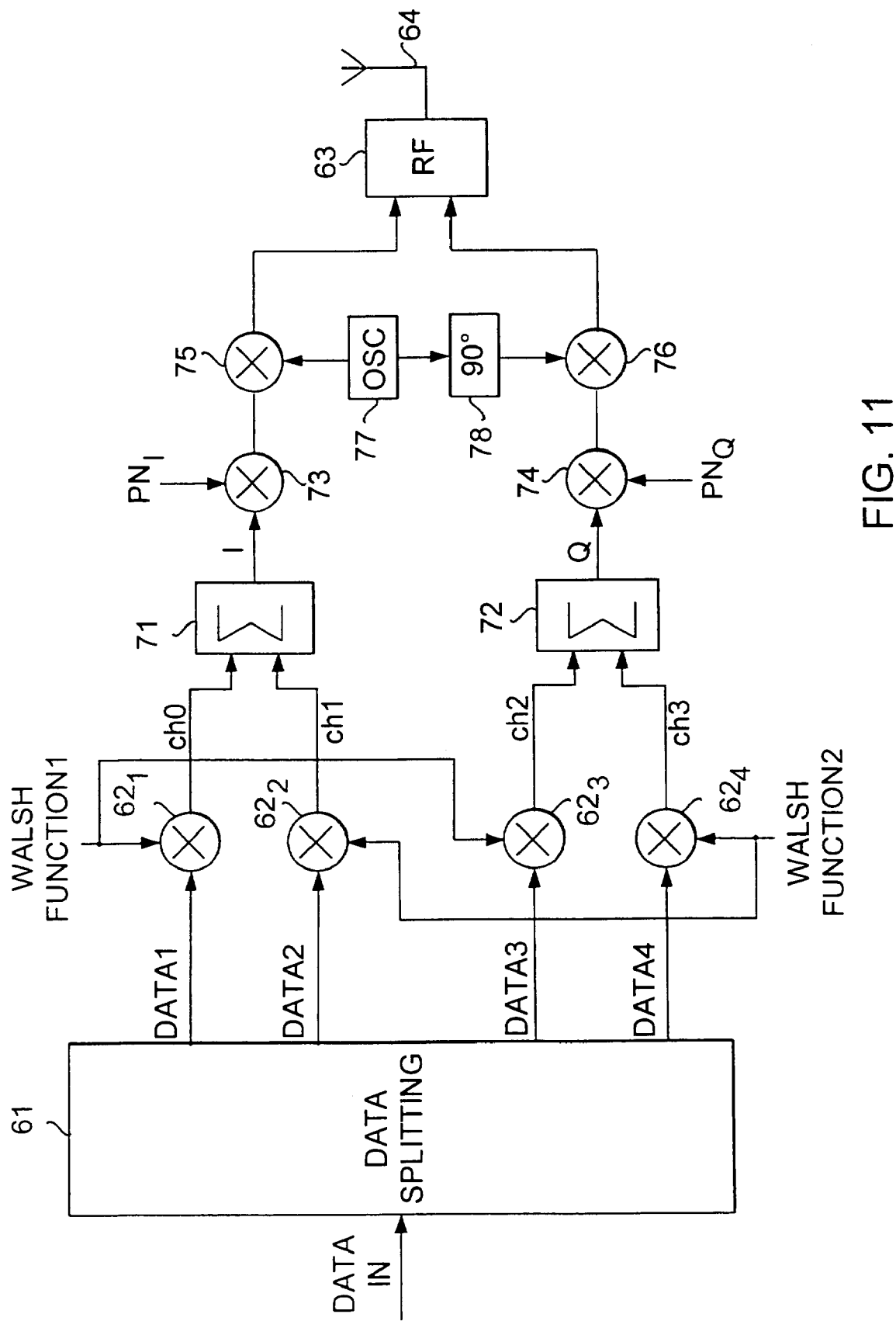
FIG. 11 shows a CDMA transmitter in which four CDMA traffic channels can be divided between quadrature (Q) and in-phase (I) branches in a QPSK modulator.

The RF parts 63 and 66 normally comprise transmitting and receiving filters. Often also a QPSK (Quadrature Phase Shift Keying) modulator is used. FIG. 11 show an example of how four channels can be divided between quadrature (Q) and in-phase (I) branches in a QPSK modulator. High-speed data signal DATAIN is splitted into slow-speed data streams DATA1 . . . DATA4 and fed to multipliers $62_1$ . . . $62_4$ (Walsh encoders), respectively. In multipliers $62_1$ and $62_3$, data streams DATA1 and DATA3 are multiplied by Walsh funtion 1. Similarly, in multipliers $62_2$ and $62_4$, data streams DATA2 and DATA4 are multiplied by Walsh funtion 2. The outputs of multipliers $62_1$ and $62_2$ are summed in summing block 71, and fed to the I branch of the QPSK modulator. The outputs of multipliers $62_3$ and $62_4$, are summed in summing block 72, and fed to the Q branch of the QPSK modulator. The signals of the I and Q branches are multiplied by different spreading codes $PN_I$ and $PN_Q$ in multipliers 73 and 74, respectively. The actual spreading is done by these "outer" spreading codes. The resulting I and Q signals multiplied by the in-phase (from local oscillator 77) and quadrature (via 90 degree phase shifter 78 from the oscillator 77) oscillator signals, and fed through other RF parts 63 to antenna 64.

The figures and the explanation connected therewith are only intended to illustrate the present invention. The method of the invention may vary in its details within the scope of the attached claims.

What is claimed is:

1. A method for data transmission in a digital mobile communication system having allocatable resources including a plurality of traffic channels, in which one or more traffic channels can be allocated to a mobile station for data transmission in accordance with requirements set by an application using said mobile station, said method comprising:

determining, for a data call, a desired level of service for a user data transfer, said desired level of service having limits; and dynamically adjusting a channel configuration consisting of one or more traffic channels allocated to said mobile station from among said plurality of traffic channels, for said data call, within said limits of said desired level of service, depending on the varying allocation state of said resources of said mobile communication system, wherein said adjusting comprises:

detecting that there are otherwise unallocated traffic channel resources available in a cell which is currently serving said mobile station, detecting in said cell that said desired level of service is unmet by an existing channel configuration, allocating to said mobile station for said data call a higher channel configuration from among said otherwise unallocated traffic channel resources, and sending from a base station system serving said cell, to said mobile station, a handover command message or an additional channel assignment message containing information channel configuration allocated to said mobile station as a consequence of said allocating.

2. A method for data transmission in a digital mobile communication system having allocatable resources including a plurality of traffic channels, in which one or more traffic channels can be allocated to a mobile station for data transmission in accordance with requirements set by an application using said mobile station, said method comprising:

determining, for a data call, a desired level of service for a user data transfer, said desired level of service having limits; and dynamically adjusting a channel configuration consisting of one or more traffic channels allocated to said mobile station from among said plurality of traffic channels, for said data call, within said limits of said desired level of service, depending on the varying allocation state of said resources of said mobile communication system, wherein said adjusting comprises:

detecting a shortage of resources in a cell currently serving said mobile station, detecting in said cell that said data call has a desired service level of which allows a lower channel configuration than said channel configuration currently allocated to said mobile station for said data call, allocating to said mobile station for said data call said lower channel configuration than said currently allocated channel configuration, and sending from a base station system serving said cell to said mobile station, a handover command message or an additional channel assignment message containing information as to channel configuration allocated to said mobile station as a consequence of said allocating.

3. A method for data transmission in a digital mobile communication system having allocatable resources including a plurality of traffic channels, in which one or more traffic channels can be allocated to a mobile station for data transmission in accordance with requirements set by an application using said mobile station, said method comprising:

determining, for a data call, a desired level of service for a user data transfer, said desired level of service having limits, wherein said determining comprises:
indicating a maximum desired level of service by said mobile station, and
selecting a minimum level of service by said mobile communications system; and dynamically adjusting a channel configuration consisting of one or more traffic channels allocated to said mobile station from among said plurality of traffic channels, for said data call, within said limits of said desired level of service, depending on the varying allocation state of said resources of said mobile communication system.

4. A digital mobile communication system, comprising:

a mobile station;

means for providing allocatable resources including a plurality of traffic channels for data transmission, arranged such that one or more of said traffic channels can be allocated to said mobile station for data transmission for a data call in accordance with the requirements set by an application using said mobile station, and an adjuster which dynamically adjusts said channel configuration consisting of one or more traffic channels allocated to said mobile station for said data call within limits of a desired level of service of said data call, depending on the varying allocation state of said resources of said mobile communication system, said adjuster further comprising:
a first detector which detects that there are otherwise unallocated traffic channel resources available in a cell which is currently serving said mobile station,
a second detector which detects, in said cell, that said desired level of service is unmet by an existing channel configuration,
an allocator which allocates said mobile station for said data call a higher channel configuration from among said otherwise unallocated traffic channel resources, and a transmitter which sends from a base station system serving said cell to said mobile station, a handover command message or an additional channel assignment message containing information channel configuration allocated to said mobile station as a consequence of said allocating.

5. A digital mobile communication system, comprising:

a mobile station;

means for providing allocatable resources including a plurality of traffic channels for data transmission, arranged such that one or more of said traffic channels can be allocated to said mobile station for data transmission for a data call in accordance with the requirements set by an application using said mobile station, and an adjuster which dynamically adjusts said channel configuration consisting of one or more traffic channels assigned allocated to said mobile station for said data call within limits of a desired level of service of said data call, depending on the varying allocation state of said resources of said mobile communication system, said adjuster further comprising:
detecting a shortage of resources in a cell currently serving said mobile station,
detecting in said cell that said data call has a desired service level of which allows a lower channel configuration than said channel configuration currently allocated to said mobile station for said data call,
allocating to said mobile station for said data call a lower channel configuration than said currently allocated channel configuration, and
sending from said base station system serving said cell to said mobile station, a handover command message or an additional channel assignment message containing information as to channel configuration allocated to said mobile station as a consequence of said allocating.

6. A digital mobile communication system, comprising:

a mobile station;

means for providing allocatable resources including a plurality of traffic channels for data transmission, arranged such that one or more of said traffic channels can be allocated to said mobile station for data transmission for a data call in accordance with the requirements set by an application using said mobile station;

an indicator which indicates a maximum desired level of service by said mobile station;

a selector which selects a minimum level of service by said mobile communications system; and an adjuster which dynamically adjusts said channel configuration consisting of said one or more traffic channels allocated to said mobile station for said data call within limits of a desired level of service of said data call, depending on the varying allocation state of said resources of said mobile communication system.

* * * * *